(12) United States Patent
Fusillo

(10) Patent No.: US 11,124,397 B2
(45) Date of Patent: Sep. 21, 2021

(54) FISHING POLE LIFTING DEVICE WITH PULLEY WHEELS AND OFFSET FIXATION POINTS

(71) Applicant: Ricky Fusillo, Garden City Park, NY (US)

(72) Inventor: Ricky Fusillo, Garden City Park, NY (US)

( * ) Notice: Subject to any disclaimer, the term of this patent is extended or adjusted under 35 U.S.C. 154(b) by 0 days.

(21) Appl. No.: 16/725,104

(22) Filed: Dec. 23, 2019

(65) Prior Publication Data
US 2020/0346904 A1    Nov. 5, 2020

Related U.S. Application Data

(62) Division of application No. 16/402,810, filed on May 3, 2019, now Pat. No. 10,569,997.

(51) Int. Cl.
*A01K 87/04* (2006.01)
*B66D 3/06* (2006.01)

(52) U.S. Cl.
CPC ............ *B66D 3/06* (2013.01); *A01K 87/04* (2013.01)

(58) Field of Classification Search
CPC .................. B66D 3/06; A01K 87/04
See application file for complete search history.

(56) References Cited

U.S. PATENT DOCUMENTS

| | | | | |
|---|---|---|---|---|
| 1,614,104 A * | 1/1927 | Comstock | .............. | B65H 54/22 242/275 |
| 2,871,614 A * | 2/1959 | Roff | ....................... | A01K 97/01 43/15 |
| 3,315,400 A * | 4/1967 | Axelson | .................. | A01K 87/04 43/24 |
| 3,448,628 A | 6/1969 | Shimano et al. | | |
| 3,581,427 A * | 6/1971 | Reinertson | ............. | A01K 87/04 43/24 |
| 3,679,012 A * | 7/1972 | Haulotte | ................. | B66D 3/04 177/147 |
| 3,785,219 A | 1/1974 | Anthamatten | | |
| 4,014,127 A * | 3/1977 | Turner | .................... | A01K 87/00 43/27.4 |
| 4,417,718 A * | 11/1983 | Niskln | ..................... | B66D 3/06 254/394 |
| 5,051,027 A * | 9/1991 | Horton | ..................... | B63C 3/06 405/3 |
| 5,531,041 A * | 7/1996 | Betto | ..................... | A01K 87/04 43/24 |
| 6,056,274 A * | 5/2000 | Naas | ...................... | B63C 15/00 248/317 |
| 6,129,033 A * | 10/2000 | Jarrell | ..................... | B63B 21/04 114/199 |
| 6,159,118 A | 12/2000 | Campbell | | |
| 6,361,022 B1 * | 3/2002 | Lob | ........................ | B63C 15/00 114/44 |
| 7,905,805 B2 | 5/2011 | Hara | | |
| 8,056,883 B1 * | 11/2011 | Brockie | ................... | B66D 3/04 254/278 |

(Continued)

FOREIGN PATENT DOCUMENTS

WO      199301967 A1    2/1993

*Primary Examiner* — Michael E Gallion
(74) *Attorney, Agent, or Firm* — Dilworth & Barrese, LLP

(57) ABSTRACT

There is provided herein a load-lifting device for personal or mechanical use, a method of operating the load-lifting device and a fishing pole having the load-lifting device.

7 Claims, 5 Drawing Sheets

(56) References Cited

U.S. PATENT DOCUMENTS

| | | | |
|---|---|---|---|
| 8,777,287 B2 | 7/2014 | Ludwig et al. | |
| 9,400,037 B2 | 7/2016 | Hara | |
| 9,504,239 B2* | 11/2016 | Stender | A01K 87/025 |
| 9,617,128 B2* | 4/2017 | Maurice | B66D 3/02 |
| 10,569,997 B1* | 2/2020 | Fusillo | B66D 3/06 |
| 2006/0032108 A1* | 2/2006 | Roth | A01K 87/04 43/24 |
| 2009/0258738 A1 | 10/2009 | Hara | |
| 2011/0256971 A1 | 10/2011 | Kilshaw | |
| 2014/0138340 A1* | 5/2014 | Miller | B66D 3/04 212/336 |
| 2014/0360085 A1* | 12/2014 | Stender | A01K 87/04 43/18.1 CT |
| 2015/0201595 A1* | 7/2015 | Takenouchi | A01K 87/04 43/24 |
| 2016/0096587 A1 | 4/2016 | Bachman et al. | |
| 2018/0104615 A1* | 4/2018 | Heath | A63J 1/028 |
| 2019/0159438 A1* | 5/2019 | Stirling | A01K 87/04 |

* cited by examiner

FISHING POLE LIFTING DEVICE WITH PULLEY WHEELS AND OFFSET FIXATION POINTS

This application is a divisional of U.S. patent application Ser. No. 16/402,810, filed May 3, 2019, the entire contents of which are incorporated herein by reference in its entirety.

BACKGROUND

1. Field of the Invention

The present application is directed to device which facilitates a reduction in the force necessary to lift an item.

2. Background of the Art

The movement of loads from one location to another has conventionally required a great deal of personal effort and can pose challenges for many such as the elderly or the infirm. In addition, such personal effort can cause undesirable physical exertion and may even raise medical issues for a person engaged in movement of a load. While various means for moving items from one location to another exist, such means often involve complicated and/or motorized technology that can be either awkward or expensive, and thus, pose further restraints to use. Thus, it would be advantageous if there were a portable personal lifting device that overcame some of the above-noted difficulties.

SUMMARY

The inventors herein have provided a device which can easily move loads with a much-reduced personal effort from one location to another by a single user without the need for a motor or complicated machinery.

There is provided herein a load-lifting device comprising:
a grasping component;
a load-connection component;
a load-reduction device comprising:
  at least two wheels, a longitudinal fixation component, and at least two wheel connection components, wherein the at least two wheels are each in a fixed longitudinal offset position relative to each other and relative to the longitudinal fixation component and are each set apart from and connected to the longitudinal fixation component by one of the connecting elements; and,
  a fixed length of load-bearing line having a first end connected to the grasping component, and a second end connected to the load-connection component, and connected therebetween in an arc of contact to each of the wheels of the load-reduction device.

There is also provided herein a method of lifting a load with the above-noted load-lifting device, wherein the method comprises the steps of:
holding the handle of the longitudinal fixation component;
grasping the grasping component;
connecting a seated load to the load-connection component; and,
pulling up on the grasping component to elevate the seated load.

In addition, there is provided a fishing pole system comprising: a fishing pole; and,
a load-reduction device attached along a longitudinal axis of the fishing pole,
wherein the load-reduction device comprises:
  at least two wheels, a longitudinal fixation component, and at least two wheel connection components, wherein the at least two wheels are each in a fixed longitudinal offset position relative to each other and relative to the longitudinal fixation component and are each set apart from and connected to the longitudinal fixation component by one of the connecting elements.

BRIEF DESCRIPTION OF THE DRAWINGS

Various embodiments are described below with reference to the drawings wherein.

Like reference numerals indicate similar parts throughout the figures

DETAILED DESCRIPTION OF PREFERRED EMBODIMENT(S)

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
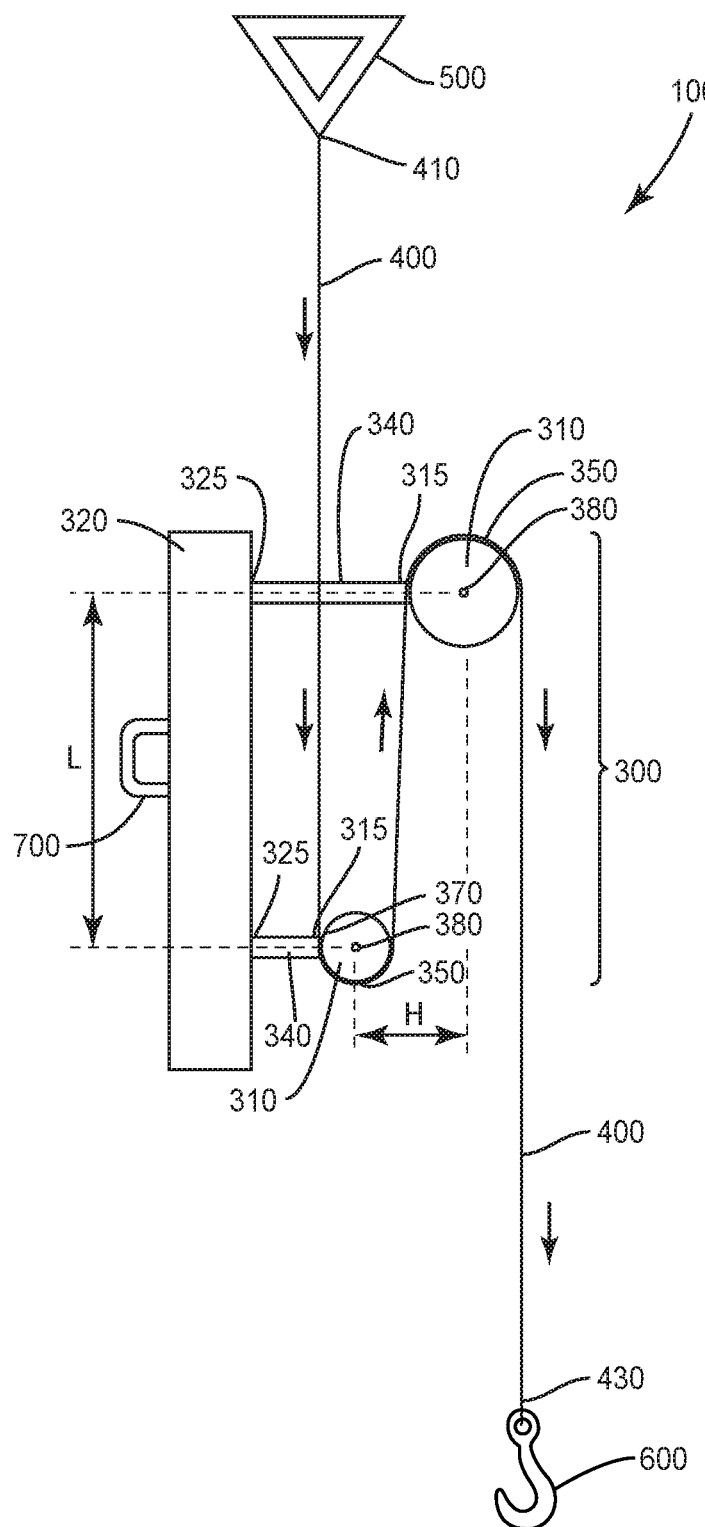
FIG. 1 is a side view of the load-lifting device according to the present disclosure.

Referring to FIG. 1, there is provided a load-lifting device 100 which contains a grasping component 500, a load-connection component 600, a load-reduction device 300, and a fixed length of load-bearing line 400.

The load-reduction device 300 contains at least two wheels 310 and a longitudinal fixation component 320. The longitudinal fixation component 320 has the at least two wheels 310 fixed in a longitudinal offset position relative to each other and relative to the longitudinal fixation component 320, the latter being in one embodiment, along a center line (not shown) of the longitudinal fixation component 320. The at least two wheels 310 are each connected to the longitudinal fixation component by a separate connection element 340.

The longitudinal offset position of the at least two wheels 310 relative to the longitudinal fixation component 320 can be wherein the longitudinal offset position of the least two wheels 310 is along the center line of the longitudinal fixation component 320, and where they are offset by at least the longitudinal distance L and the horizontal distance H. In addition, the offset can comprise a separation of the wheels 310 from the center line 330 along a distance Z, which is shown in FIGS. 4A and 4B. In one embodiment the longitudinal distance can be the longitudinal length along the longitudinal fixation component 320 between the center points 380 of each wheel 310 such as in shown in FIGS. 1, 2 and 5. In another embodiment the longitudinal distance L can be the length of the entire longitudinal fixation component 320 such as in FIGS. 4A and 4B In one specific embodiment, the load-lifting device 100 is such that the fixed offset longitudinal position of the at least two wheels 310 is such that each of the wheels 310 are set in a different longitudinal position along the length of the longitudinal fixation component. The different longitudinal position of the at least two wheels 310 along the length of the longitudinal fixation component 320 results in the wheels 310 having a longitudinal offset L as illustrated in FIGS. 1-5.

This distance L can be set depending on the load and the desired ability to lift the load. It is also understood herein that the wheels 310 can be set in at any suitable longitudinal distance apart on the longitudinal fixation component as indicated herein. For example, such a longitudinal distance L may be from about 3 to about 20, preferably from about 6 to about 10.

In another embodiment herein, the longitudinal distance L between the wheels 310 is a function of the diameter of the wheels 310 in the load-reduction device 300. For example, in one embodiment, the wheels 310 can each be of the same diameter or can each have different diameters. Preferably the wheels 310 have the same diameter. The wheels 310 can have any diameter suitable for the load-reduction device 300, but preferably can be from about ½ in. to about 5 in., preferably from about 1 to about 4 and most preferably from about 2 to about 3. The longitudinal distance L can thus be from about 1 diameter of the wheels 310 up to about 10 diameter lengths of the wheels 310, preferably from about 2 to about 8 diameter lengths of the wheels 310.

Figure 3:
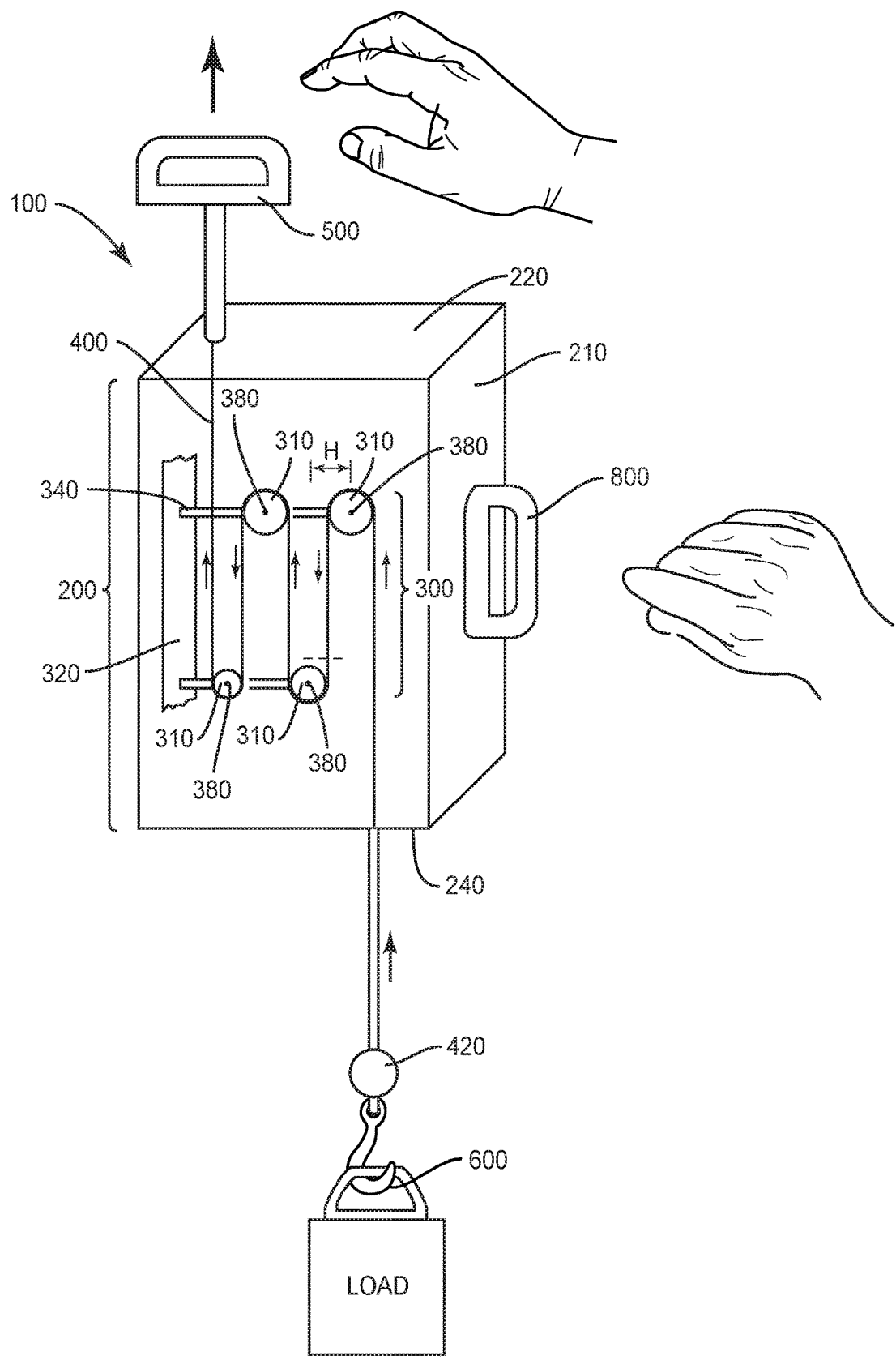
FIG. 3 is a different embodiment of the load-lifting device with an internal view of the encasement unit containing multiple wheels and wherein the encasement unit has a bracing handle, according to the present disclosure.
Figure 4A:
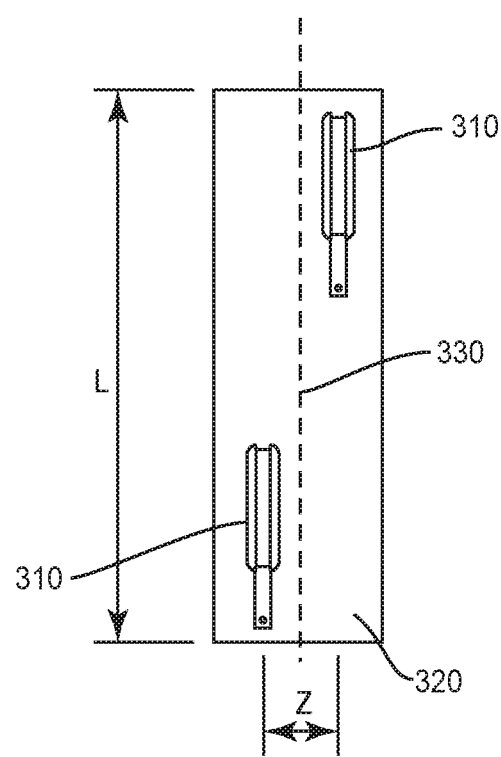
FIG. 4A is a top view of the wheels in a fixed longitudinal offset position relative to each other along a center line of the longitudinal fixation component according to the present disclosure.
Figure 4B:
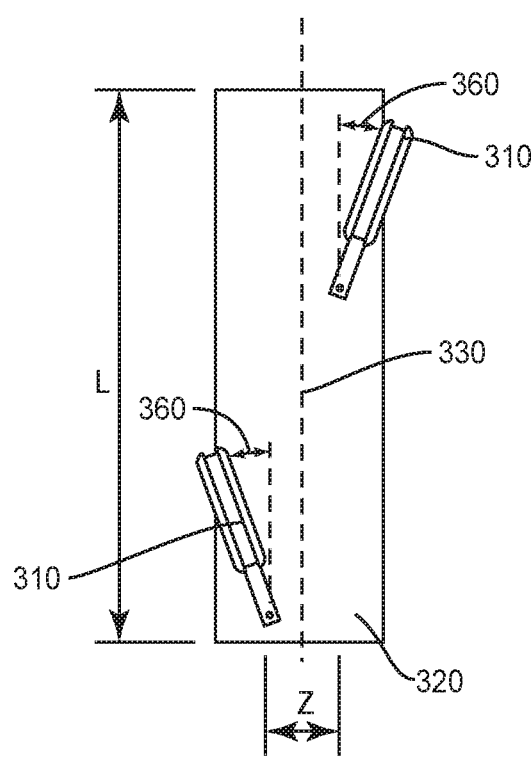
FIG. 4B is a top view of the wheels in a fixed longitudinal offset position relative to each other along a center ling of the longitudinal fixation component and which are angled from the center line, according to the present disclosure; and, FIG. 5 is a fishing pole system comprising the load-reduction device according to the present disclosure.

In one embodiment herein, the load-reduction device 300 can have more than 2 wheels 310, and can in some embodiments have 3 or 4, or more wheels 310 such as is depicted in FIG. 3. The wheels 310 can each be of a different size or of the same size. If the wheels 310 are each the same size they each bear an equal portion of the force of the load-reducing device 300. Therefore, two wheels 310 reduce the force by ½ and three by ⅓. However, if the wheels 310 are of different size then each pulley 310 will still bear the same force being assisted but the larger pulley(s) 310 will rotate slower than the smaller pulleys 310 which will rotate faster. The formula for determining pulley and belt ratio is the division of the drive pulley diameter by the load pulley diameter will be the pulley and belt ratio. A force ratio in a simple machine amplifies the input (effort) force to a larger output (load) force. The force ratio can be expressed as $$F_r = F/S$$

where
$F_r$=force ratio-mechanical advantage
F=load force (N, $lb_f$)
S=effort force (N, $lb_f$).

The wheels 310 can be any suitable conventional wheel that will allow the lifting device 100 to function as described herein. In one specific embodiment the wheels 310 can be selected from the group consisting of a pulley, gear, sprocket, hub, rim, axis, shaft, knob, housing, arm, slot and blade.

In one embodiment herein the longitudinal fixation component 320 can be made of plastic, metal, or any other suitable material, and can be of a length which is larger than the length L described herein. Some suitable examples of the length of the longitudinal fixation component 320 is from about 5 to about 20, preferably from about 8 to about 12. In one embodiment herein the longitudinal fixation component 320 can have a bracing handle 700 attached thereto. Preferably, the bracing handle 700 is located at a position midway between the wheels 310 on the longitudinal fixation component. Alternatively, instead of a bracing handle 700, the longitudinal fixation component 320 can contain a molded hand grip (not shown) in the same position noted for the bracing handle 700. The bracing handle 700 or the molded hand grip can facilitate a user, preferably a single user, to hold the load-lifting device 100, preferably as a single user hand-held load lifting device 100. The user can hold the bracing handle 700 or molded grip, with one hand while using the other hand to grasp the grasping component 500 in the operation of the device 100 as is described herein.

The at least two wheel connection components 340 can each be of a different length. Some suitable examples of the length of the wheel connection components can be from about 1 in. to about 8 in. and preferably from about 2 in. to about 6 in. The wheel connection components 340 can have the wheels 310 at the wheel attachment end 315 and the wheel connection components 340 can be attached at the fixing side 325. The different length of the two wheel connection components 340 can be such that when attached to the longitudinal fixation component 320 at fixing side 325, the at least two wheels 310 attached at the wheel attachment ends 315 are set at different horizontal distances in the same horizontal direction from the longitudinal fixation component 320, resulting in the offset H.

The wheels 310 can be attached to the wheel connection components 340 at the wheel attachment end 315 and the fixing side 325 using conventional means such as screws, bolts and the like. The wheel connection components 340 can be of any suitable size or shape, and can be, for example, any of posts or columns, either straight or tapered.

Figure 2:
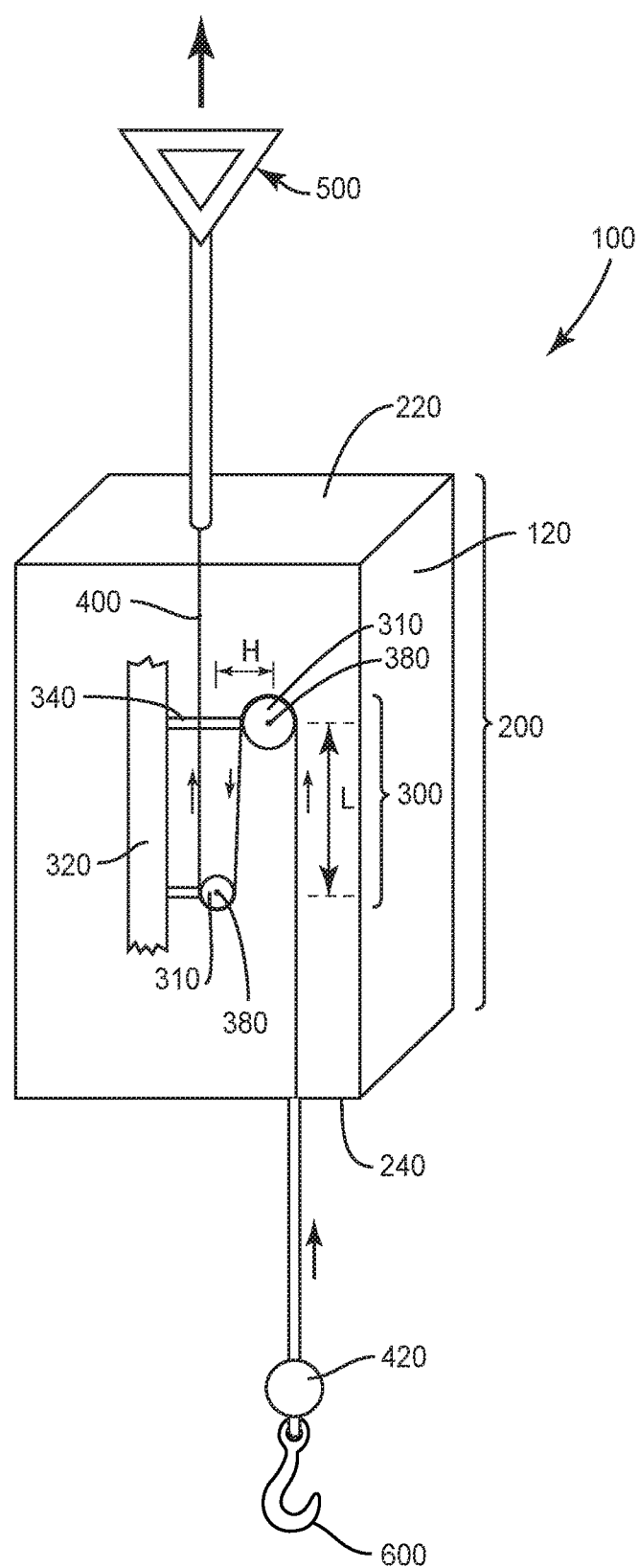
FIG. 2 is a view of the load-lifting device with an internal view of the encasement unit containing the load reduction device and the fixed length of load-bearing line connected thereto, according to the present disclosure.

In addition to the wheels L being offset in a longitudinal distance L apart, they can also be also offset at a horizontal distance "H" apart, as is depicted in FIG. 1 and FIG. 2. The horizontal distance H can in one embodiment be from about ½ in. to about 8 in., preferably from about 2 in. to about 4 in. The horizontal distance H in one embodiment will be such that it facilitates and permits the load-bearing line 400 to pass from one wheel 310 to the next wheel 310 without rubbing or interference of one direction of the load-bearing line 400 with another direction of the load-bearing line 400, such as is depicted in FIG. 3.

Referring to FIG. 1 and FIGS. 4A and 4B, the fixed offset longitudinal position of the at least two wheels 310 can also be such that the attachment of the connection components 340 at the fixing side 325 are a fixed distance apart Z in opposite horizontal directions from the center line 330 of the longitudinal fixation component 320. The offset Z can comprise a separation of the wheels 310 from the center line 330 along a distance Z, which is shown in FIGS. 4A and 4B of a distance of from about ¼ in. to about 2 in., preferably from about ½ in. to about 1 in.

In addition to the offsets L, H and Z, or alternatively thereto, both wheels 310 can be offset at an equivalent angle 360 to the center line 330 of the longitudinal fixation component 320 as is depicted in FIG. 4B. The angle is depicted in FIG. 4B is shown by the arrows therein. The angle can be any suitable angle for the operation of the lifting device 100 but preferably can be from about 1 to about 20 degrees, preferably from about 2 to about 15 degrees and most preferably from about 4 to about 14 degrees.

Referring to FIG. 3, there is provided a lifting device 100 which comprises an encasement unit 200. The encasement unit 200 can be of any shape or size that is suitable. In FIG. 2, the encasement unit 200 is shown in a rectangular shape, although, square boxes, oval spheres, and the like are also envisioned. The encasement unit 200 can be made of any suitable material, but can include for example, metal, plastic, wood, cardboard or the like. The encasement unit 200 has a top 220 and a bottom 240 and can be of any suitable length provided it can house the load-reduction device 300 therein. In one non-limiting embodiment, the encasement unit 200 can be from about 6 in. to about 24 in. in length, preferably, from about 8 in. to about 14 in. in length. The width of the encasement unit 200 can also be of any suitable length, but in one non-limiting embodiment can be from about 2 in. to about 12 in. and preferably from about 3 in. to about 5 in.

The encasement unit 200 contains the load-reduction device 300. The load reduction device 300 can comprise any number of wheels of 2 or greater, such as 3, 4, 5, 6, 8, 10, and 12 wheels, and the like, and the number of wheels can be chosen depending on the load to be lifted, the size of the load to be lifted, or any other suitable factor. In one embodiment the load-reduction device 300 has 4 wheels as depicted in FIG. 3. In one other embodiment, such as is depicted in FIG. 3, the encasement unit 200 can have a bracing handle 800 attached to the side 120 of the encasement unit 200.

The longitudinal fixation component(s) 320 can each accommodate any number of wheels 310, such as 2 or more, preferably 2. In one embodiment the encasement device 200 contains at least one, preferably 2 longitudinal fixation components 320.

The load-reduction device 300 can be fixed in position in the encasement unit 200 by the longitudinal fixation component(s) 320. Such a fixing of the longitudinal fixation device(s) 320 in the encasement unit 200 can be accomplished by any conventional means, but can be for example, by the use of screw, bolts or adhesives. In one embodiment, the longitudinal fixation device(s) 320 are adhered to the interior walls of the encasement unit 200 by such means. The encasement unit 200 can have a handle 800 such as is shown in FIG. 3 to function to brace the holder of the load-lifting device in the same manner as described herein with regard to the bracing handle 700 or molded grip of the load-lifting device 100 in the absence of an encasement unit 200.

The fixed length of load-bearing line 400 wraps around at least a portion of the outer circumference of each wheel 310, i.e. an arc of contact 350 as shown in FIG. 1. In one embodiment, the fixed length of load-bearing line 400 has a first end 410 which is attached to the grasping component 500. A second end 430 of the load-bearing line 400 can be connected to the load-connection component 600. The load-bearing line 400 between its first end 410 and second end 430 is connected in an arc of contact 350 to each of the wheels 310 of the load-reduction device 100 as described herein.

The arc of contact 350 of the wheels 310 contacted by the load-bearing line 400 during operation of the load-lifting device 100 is a sufficient amount of the circumference of each wheel 310 to facilitate the engagement of the wheel 310 with the load-bearing line 400. Preferably from at least about 30% of the wheel 310 circumference to about 70% of the wheel 310 circumference, and more preferably from about 40% to about 60% of the wheel circumference. The arc of contact 350 can be different for each wheel 310 in the load-reduction device 300, or can be the same.

Figure 5:
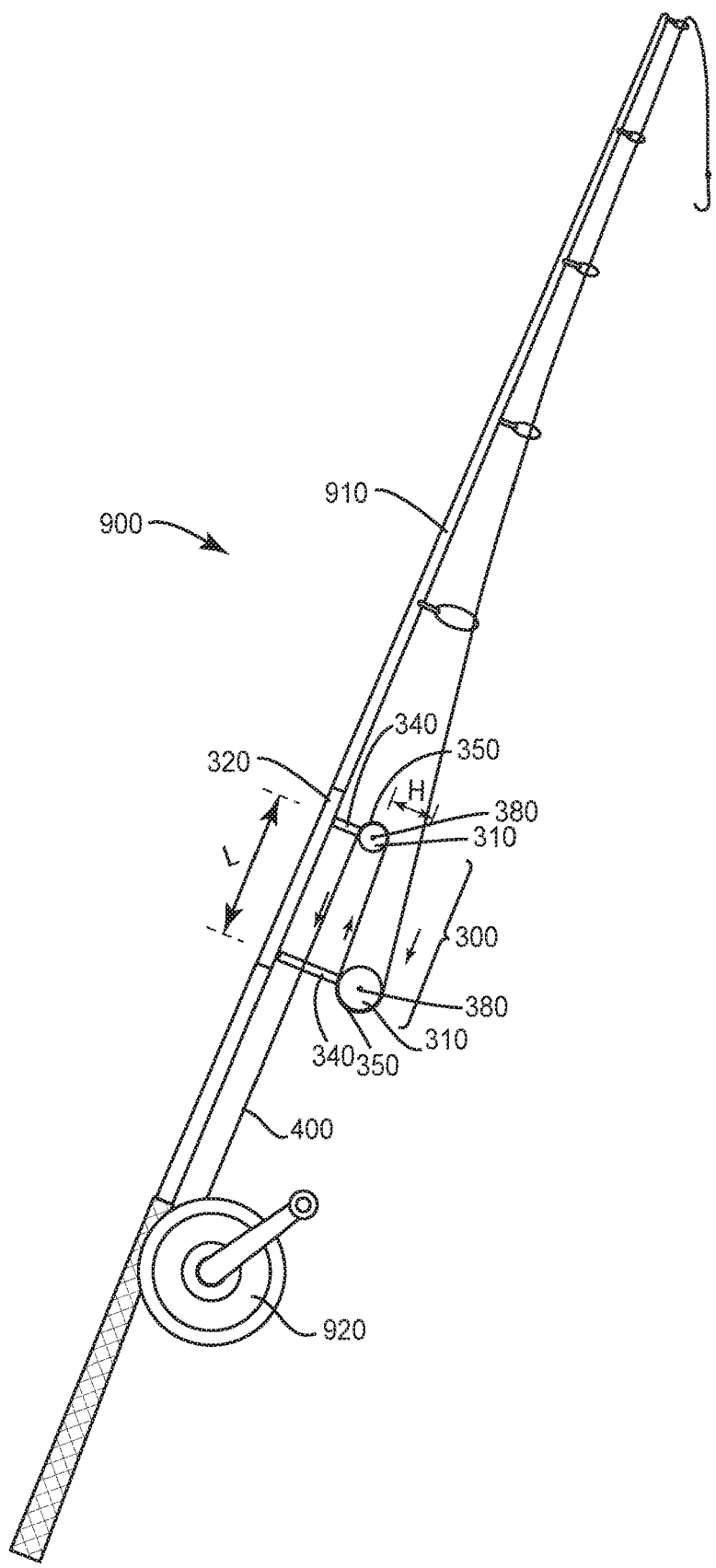

Referring to FIG. 1 the load bearing line 400 is wrapped around an arc of contact 350 of a wheel 310 located further away in the longitudinal direction L from the grasping component 500 and then subsequently around an arc of contact 350 of the wheel 310 located closer in the longitudinal direction L to the grasping component 500, and wherein the load bearing line 400 in its direction of feed (as shown by the arrows in FIGS. 1 and 5) substantially reverse direction therebetween. It will be understood that substantially reversing in direction can comprise a direction of a line drawn tangentially to, but between the edges of the two wheels 310, (such as in the non-limiting embodiment of FIG. 1) such that a load-bearing line 400 is then in fed a direction which is pointed in a direction opposite to the direction that the load-bearing line 400 was fed prior to entering an entry point 370 of the wheel 310. In FIGS. 2-4, the arrows next to the line 400 show the direction of movement of the line 400 when the device is in operation, e.g., when it is lifting a load. In FIGS. 1 and 5, the arrows on the line 400 represent the direction of feed of line 400, but it is understood that those arrows reverse direction in operation, such as when the device of FIG. 1 and FIG. 5 is lifting a load.

In one embodiment herein, the fixed length of load bearing line 400 does not cross itself in the load-reduction device 300. The fixed length of load bearing line 400 can be any conventional line, but in one embodiment may be selected from the group consisting of a chain, belt, cable, cord, elastic, rope, string, twine, and fishing line. Preferably the fixed length of load bearing line is a rope. The fixed length of load bearing line 400 can have an engageable stop mechanism 420 on a top 220 or bottom 240 of the encasement unit 200. As shown in FIG. 3, the engageable stop mechanism can be a ball of any suitable material located on the load-bearing line 400 between the bottom 240 of the encasement unit 200. When the load-lifting device 100 is operated as described herein, such an engageable stop mechanism 420 can prevent the load-connection component 600 from entering and/or damaging the bottom 240 of the encasement unit 200.

In one embodiment, the load-bearing line 400 from its connection at first end 410 to the grasping component 500, passes through the top 220 of the encasement unit 200 in any suitable fashion, such as through an aperture, or conduit therein, provided in one embodiment, the grasping component 500 at the first end 410 is located above the encasement unit 200. The load-bearing line 400 is of a sufficient length to pass from the first end 410 connection to the grasping component 500 through the load-reduction device 300, and through the bottom 240 of the encasement unit 200 to the second end 430 connected to the load-connection component 600 beneath the encasement unit 200. In one embodiment herein, the load-bearing line 400 can from about 1 ft to about 6 ft, preferably from about 2 ft to about 4 ft.

The grasping component 500 of the load-lifting device, as shown in FIGS. 1-3 can be of any suitable shape, size or material. For example, the grasping component can be a conventional handle in a triangle, square or circular shape, and can be hand sized and be made of plastic, textile material, a loop of cord and the like. For example, the grasping component 500 can have a triangular shape such as is FIGS. 1 and 2, or a rounded shape for easier grasping such as in FIG. 3. The grasping component 500 can be made of any suitable material, and can even be a loop of the line 400 after it passes through the top 220 of the encasement unit 200 as described herein.

The load-connection component 600 can be at the other end of the line 400 that is fed through the bottom 240 of encasement unit 200. The lifting device can comprise any means known for the lifting of an item off of the ground, and can include for example any one of a hook, a clasp, a magnet, a vacuum, a platform, a prong, a sling, a pallet lifter, a spreader lifter, tongs or a shovel. Preferably, the lifting device 600 is a hook attached to the end of the line 400. In one embodiment herein, there is a stop 420 on the line 400 above the lifting component 600, so that during operation of the lifting device, the lifting component 600 does not make contact with the bottom 240 of the encasement unit 200.

The load-lifting device 100 can be part of another mechanical device used for lifting items, such as the non-limiting examples of a crane, a pallet lifter, a fork lift, scissor lift, chair lift and the like.

While not wishing to be bound by theory it is believed that the load-lifting device 100 as shown in the attached figures and described herein, provides for the lifting device 100 in operation to produce a leverage on the load-bearing line 400 which reduces the force necessary to lift a load through the assistance of the wheels 310. Preferably, the lifting device 100 herein provides a user with a lifting force reduction of at least 25%, preferably at least 75% and more preferably at least 50% of the lifting force needed to lift the load compared to lifting the load in the absence of the lifting device 100.

In operation, the lifting device functions by a user, preferably a single person, lifts up on the grasping component 500, preferably while also holding onto the bracing handle 700, the molded grip, or the handle 800, wherein the lifting up on the engagement handle 500, causes the load-bearing line 400 which passes through the top 220 of the encasement unit, around the wheels 310 as described herein and through the bottom 240 of the encasement unit 240 while attached to the lifting connection component 600 to lift a load which can be attached to the lifting connection component 600. The use of the lifting device 100 provides for a decreased effort necessary to lift the load as compared to without the use of the lifting device. While holding the grasping component 500 and the bracing handle 700, or the molded grip or handle 800, the user can manipulate and place the load anywhere desired with ease. The load can be released by lowering the grasping component 500 and/or placing the load on the floor or other suitable surface.

Referring to FIG. 5 there is provided herein a fishing pole system 900 as described herein, which comprises a fishing pole 910 and a load-reduction device 300 as described herein which can be attached along a longitudinal axis L of the fishing pole. The fishing pole system 900 can further comprise a fishing reel 920 and the load-bearing line 400 as described herein. The fishing pole system 900 can comprise any of the other components, methods and embodiments described herein for the lifting device 100, but preferably not the grasping component 500 or the lifting connection component 600.

As is in the other embodiments described herein above, the fishing pole system 900 further comprises that the load-bearing line 400 is in an arc of contact 350 to each of the wheels 310 of the load-reduction device 300. As in the load-lifting device described herein above, the fishing pole system 900 during operation requires less force to operate than an equivalent fishing pole system which is in the absence of the load-reduction device 300.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

Where this application has listed the steps of a method or procedure in a specific order, it may be possible, or even expedient in certain circumstances, to change the order in which some steps are performed, and it is intended that the particular steps of the method or procedure claim set forth herein below not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

The invention claimed is:

1. A fishing pole system comprising a fishing pole, a fixed length of load-bearing fishing line, and a load-reduction device attached along an exterior portion of a longitudinal axis of the fishing pole, wherein the load-reduction device comprises:
   at least two wheels, a longitudinal fixation component fixed on the exterior portion of the fishing pole, and at least two wheel connection components extending in a direction perpendicular to the longitudinal axis of the fishing pole, wherein the at least two wheels are each in a fixed longitudinal offset position relative to each other along a center line of the longitudinal fixation component and are each set apart from and connected to the fixed longitudinal fixation component by one of the connecting elements, and wherein the fishing line is in an arc of contact of from about 30% to about 70% to each of the wheels of the load-reduction device.

2. The fishing pole system of claim 1, wherein the operation of the fishing pole system requires less force than is needed to operate an equivalent fishing pole system in the absence of the load-reduction device.

3. The fishing pole system of claim 1 wherein the fishing line is in an arc of contact of from about 40% to about 60% to each of the wheels of the load-reduction device.

4. The fishing pole system of claim 1, wherein the fishing line reverses a direction of feed as it passes through the arc of contact of each of the at least two wheels.

5. The fishing pole system of claim 1, wherein each of the at least two wheels are connected to the fixed longitudinal fixation component by its own separate connecting element.

6. The fishing pole system of claim 4, wherein each of the separate connecting elements are in the shape of a post or a column.

7. The fishing pole system of claim 1 further comprising, a fishing reel, and wherein the fishing line in its direction of feed from the reel through the load reduction device to a tip of the fishing pole, is first wrapped around an arc of contact of a wheel located in a position further away from the reel and then subsequently around an arc of contact of a wheel located closer to the reel, and wherein the fishing line reverses a direction of feed as it passes through the arc of contact of each of the two wheels.

* * * * *